April 28, 1970     D. J. NELSON     3,508,564

ELECTRO-FLUIDIC ACTIVE DEVICES

Filed April 10, 1967     2 Sheets-Sheet 1

Desmond J. Nelson
INVENTOR

BY *Donald C. Keaveney*

ATTORNEY

Desmond J. Nelson
INVENTOR

BY Donald C. Keaveney
ATTORNEY

United States Patent Office 3,508,564
Patented Apr. 28, 1970

3,508,564
ELECTRO-FLUIDIC ACTIVE DEVICES
Desmond J. Nelson, Gardena, Calif., assignor to TRW Inc., Redondo Beach, Calif., a corporation of Ohio
Filed Apr. 10, 1967, Ser. No. 629,494
Int. Cl. F15c 1/04
U.S. Cl. 137—81.5                     1 Claim

ABSTRACT OF THE DISCLOSURE

There is disclosed a family of fluidic devices such as impact modulators, vortex amplifiers, turbulence amplifiers and the like, each having a direct electronic-to-fluidic interface such that input electrical signals can modulate the flow of a ferro-hydrodynamic fluid which is used as the supply or control fluid to the device and which in turn modualtes the flow of the power or output fluid of the device. The direct interface is achieved by using a ferro-hydrodynamic fluid comprising a colloidal suspension of minute ferrous particles as the control fluid and passing it through a supply line about which electromagnetic means such as a nonlinearly wound coil are positioned. The electrical signal establishes a magnetic field gradient in the supply line which in turn is translated into a change in the velocity; hence, the momentum of the ferro-hydrodynamic fluid. This change in fluid flow characteristics in turn is used to control the operation of the fluidic device in a known manner.

BACKGROUND OF THE INVENTION

This invention relates to the field of fluidics and more particularly to electro-fluidic active devices, the operation of which can be directly controlled by signals from electronic circuitry. The devices are thus direct electronic-to-fluidic interface devices and will hereinafter be referred to as EFI devices, since they perform the function of transducing electronic signal information into fluidic signal information without the use of moving mechanical parts and with minimum noise, time lag and distortion.

The technology commonly referred to as "fluidics" has recently developed rapidly and stems largely from the early work of Nicola Tesla and Henri Coanda, the latter of whom was responsible for identifying the wall attachment phenomena of fluids which is now referred to as the "Coanda Effect." Various fluidic control instrumentation and computer devices have since been developed. These include digital logic devices and proportional amplifiers. Unlike the more conventional fluid control technology which has relied on valves, springs, balls, diaphragms and the like, this new class of devices can carry out many of the functions which have heretofore been performed only by electronic devices. Fluidic devices are preferred over mechanical fluid power control equipment because of their high reliability due to the absence of moving parts, their greater environmental tolerance, their reduction in size and weight, and their lower manufacturing costs. In many applications, they are preferred over comparable electronic devices due to their tolerance of temperature extremes, immunity from nuclear radiation effects, shock and vibration and from stray radio-frequency signals. Additionally, these devices do not emit radio frequency signals and are generally less costly to produce than equivalent electronic circuits.

Frequently, however, it is necessary for fluidic devices to communicate with electronic systems or devices. A fluidic guidance and control system in a missile, for example, which receives inputs from electronic computers or from earth-based telemetry, requires an interface which can directly respond to the output from electronic circuits on one side and which provides fluid pressure signal outputs to fluidic circuits on the other side. Heretofore, it has been the practice to use moving mechanical parts in the mechanization of the electrical to fluid interface. Thus, electromagnetically controlled flapper valves or needle valves are commonly used. These devices, however, have a response the bandwidth of which is between five and ten cycles per second, which is substantially below that available in active fluidic devices themselves.

For a more complete discussion of the various types of fluidic devices and the problems currently existing in this art, reference is made to the magazine "Machine Design," published by the Tenton Publishing Co. in Cleveland, Ohio, and particularly to the issues of June 9 and 23, July 7 and 21, Aug. 4 and 18, and Sept. 1, 1966. A reprint of the pertinent articles in these issues is available from the publisher.

The ferro-hydrodynamic or, synonomously, ferromagnetic, fluid used herein to overcome these problems comprises a colloidal suspension of submicron size ferrite particles in a carrier fluid such as kerosene with a dispersing agent added to prevent flocculation. When a magnetic field is applied to such a fluid, a body force is developed within it which changes its velocity and momentum. For a more complete discussion of such fluids, reference is made to an article by R. E. Rosenweig, entitled "Magnetic Fluids," which appeared at pages 48–56 in the July 1966 issue of International Science and Technology, published by Conover Mast Publications in New York.

SUMMARY OF THE INVENTION

The problems of the prior art fluidic devices are overcome in the present invention by providing such a ferro-hydrodynamic fluid at least in the control or supply circuits of the fluidic device. Electromagnetic means such as a coil wound around one of the conduits of the device can then afford a direct conversion of electronic signal information to velocity and hence momentum signal information. The implementation of this technique is illustrated in particular with a vortex amplifier, an impact modulator and a turbulence amplifier. The resulting devices afford amplifiers for amplifying pressure or velocity of flow in a proportional or analog manner, and the turbulence amplifier also affords a digitally responding device which performs a NOR function which, as is well known, can in turn be used as a basis for all other logic functions.

In the achievement of the above and other objects and advantages of this invention, there is provided an EFI with no moving parts in which the input electrical signal is used to set up a magnetic field. A magnetically responsive fluid is then passed through the magnetic field so that variations in input electrical signals vary the magnetic field and hence the flow of the magnetically responsive fluid. The flow modulated, magnetically responsive fluid may then be used either directly in a fluidic circuit or may be used to modulate the flow of a magnetic or non-magnetic fluid.

BRIEF DESCRIPTION OF THE DRAWINGS

Other objects and features of the invention and a better understanding thereof may be had by referring to the following description and claims taken in conjunction with the accompanying drawings wherein:

DESCRIPTION OF THE PREFERRED EMBODIMENTS

Figure 1:
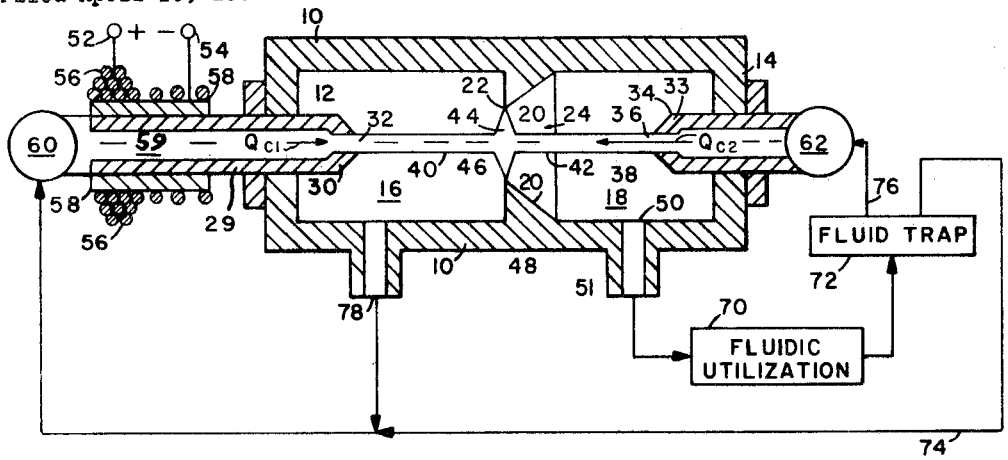
FIGURE 1 is a schematic side elevation in cutaway of an electronic-to-fluidic interface system, wherein a fluidic impact modulator device is provided with the electro-fluidic feature of the present invention.

Referring to FIGURE 1 of the drawing, the electronic-fluidic interface system shown is one wherein a fluidic impact modulator device has a body defined by walls 10 which are preferably cylindrical. The cylinder is closed by first end wall 12 and second end wall 14 to define a working chamber or plenum area. The working chamber 20 is divided into two subchambers 16 and 18 by an abutment 20 extending from the walls 10 into the interior of the cylindrical chamber. An inner circumferential edge 22 of the abutment 20 defines an orifice 24 between the two chambers 16 and 18. Extending through the first end wall 12 into the chamber 16 is a first or supply conduit 29 terminating in nozzle 30 which has an output orifice 32. Extending through the second end wall 14 into the chamber 18 is a second conduit 34 terminating in nozzle 33 which has an orifice 36. The orifices 32 and 36 are preferably circular and have a common central axis 38, so that they are positioned in co-axially opposed relationship.

When fluid is pumped through the first nozzle 30 and the second nozzle 34 in the directions and quantities represented by the vectors $Q_{C1}$ and $Q_{C2}$, upon emerging from the respective orifices 32 and 36, the fluid will form two stream flow patterns 40 and 42 which, for short distances, are centered about the common axis 38 and which thus meet head-on in the plane of the inner circumference 22, along boundary 44. This location of the impact boundary 44 is, of course, determined by the relative nozzle position and flow rate and can be changed or modulated by varying the flow characteristics from either nozzle.

Basically, therefore, the flow $Q_{C1}$ functions to modulate the flow $Q_{C2}$ because they flow in opposite directions along the common central axis 38 to collide at the boundary or plane 44 forming the radial spray pattern represented at 46 and 48. The boundary plane 44 is thus the balance point of this spray pattern and is determined by the relative momenta of the two jets $Q_{C1}$ and $Q_{C2}$, which are normally adjusted to place the boundary 44 in the plane of the orifice 24. The output chamber 18 is thereby pressurized to produce an output signal in output conduit 50 which is proportional to the amount of flow collected from spray pattern 48.

As noted above, the function of the device shown in the figure is to convert electrical signals into fluidic signals. The flow $Q_{C2}$ is the fluidic power input to be modulated; when the flow emerges from the chamber 18 at orifice 50, it is modulated in pressure and velocity by the fluidic input flow 40 which in turn is modulated by an input electrical signal. In order to achieve this modulation, input electrical signals are applied at terminals 52 and 54 of a winding 56 about a core 58 surrounding supply conduit 30. Preferably, the spacing between the turns of the winding 56 decreases in the direction of fluid flow in order to provide an increasing magnetic field so that fluid response may be to magnetic field gradient rather than simply to magnetic field strength.

Electrical signals applied across the terminals 52–54 pass through the windings 56, creating changes in the magnetic field in an area 59 between the windings 56 and the soft core 58. Since the flow $Q_{C1}$ is pumped through the area 59 by the pump 60, when ferromagnetic or ferro-hydrodynamic material is included in the flow $Q_{C1}$, the velocity or the momentum of the fluid will be altered in response to changes in the input electrical signal. If the flow $Q_{C2}$ is pumped at a steady rate by a pump 62, then the relationship at the interface 44 will vary in response to the changes in the flow $Q_{C1}$, which is to say, in response to the changes in the input electrical signal 52–54. Consequently, the flow through the output orifice 50 will vary as an ultimate result of variations in the input electrical signal.

Fluid flowing from the output orifice 50 may then be used in fluidic utilization circuitry 70, which may be any kind of fluidic circuit or device where electrical control is required. After the flow from 50 has been used by the circuitry at 70, the ferromagnetic fluid from flow $Q_{C1}$ may be separated from the fluid in the reference flow $Q_{C2}$ in a ferromagnetic fluid trap 72, which may also comprise sources of additional fluid for pumping at 60 and 62. The ferromagnetic fluid may then be returned to the pump 60 in a line 74 while the reference fluid may be returned to the pump 62 in a line 76. Thereafter the pump 60 and 62 may reuse the fluid in respective flows $Q_{C1}$ and $Q_{C2}$. Ferromagnetic fluid that does not pass through the output orifice 50 may be removed from the chamber 16 through an orifice 78 for return to the pump 60.

According to the present invention, the fluid circulated by pump 60 to form the flow $Q_{C1}$ is, as noted above, a magnetically responsive fluid, preferably one of the so-called ferromagnetic or ferro-hydrodynamic fluids. Such a fluid is a colloidal suspension of very fine particles (25 to 100 Angstrom units in diameter), of solid ferromagnetic material suspended in an organic carrier fluid.

In such a ferro-hydrodynamic fluid, the fine particles will remain in colloidal suspension indefinitely in the carrier. Thus, the fluid is magnetically responsive and yet is not changed or deprived of its magnetic particles when passing through magnetic fields. In particular, a magnetic field is applied to such a fluid, the magnitude or direction of the fluid velocity is changed responsively to and in proportion to the magnitude and direction of the magnetic field. This is to be distinguished from the usual magnetic clutch fluid, where the viscosity of the fluid is dependent upon the applied magnetic field.

Electrical signals applied across the terminals 52–54 pass through the winding 56, creating changes in the magnetic field in an area 59 inside the cylindrical core 58, upon which windings 56 are mounted. Since the flow $Q_{C1}$ is pumped through the area 59 by pump 60, when ferromagnetic material is included in the flow $Q_{C1}$, the velocity or the momentum of the fluid will be altered in response to changes in the input electrical signal generating the magnetic field, which will be directed along the line of fluid flow. If the flow $Q_{C2}$ is pumped at a steady rate by a pump 62, then the relationship at the interface 44 will vary in the response to the changes in the flow $Q_{C1}$, which is to say, in response to the changes in the input electrical signal applied to terminal 52–54. Consequently, the flow through the output orifice 50 will vary as an ultimate result of variation in the input electrical signal.

Fluid flowing from the output orifice 50 may then be used in fluidic utilization circuitry 70, which may be of any desired type or which may be any device where electrical control of fluidic action is required. After the flow from outlet orifice 50 has been used by the fluidic circuitry 70, the ferromagnetic fluid from flow $Q_{C1}$ may be separated from the hydraulic fluid in the reference flow $Q_{C2}$ in a ferromagnetic trap 72, which may also comprise a source of additional fluid for pumping by pumps 60 and 62. The ferromagnetic fluid may then be returned to the pump via line 74 while the reference fluid is fed to the pump 62 via line 76. Thereafter, the pumps 60 and 62 may reuse the fluid in respective flows $Q_{C1}$ and $Q_{C2}$. Ferromagnetic fluid which does not pass through the output orifice 50 may be removed from the chamber 16 through an orifice 78 for return to the pump 60.

Alternatively, it should be noted that the entire system may operate on ferromagnetic fluid so that the pumps 60 and 62 are both initially supplying such fluid to their respective conduits. In such a system, the separation function of the trap 72 is unnecessary and the fluid trap 72 would serve merely as a reservoir. Where the separation is necessary, the fluid trap is preferably arranged for either a gravity or a magnetic separating action.

There is thus shown in FIGURE 1 an electro-fluidic interface for an active device having no moving parts and having very simple construction. When it is considered that fluid pumping for the fluidic utilization circuitry 70 must be done regardless of whether the fluid flow is to be modulated or not, the gain from the present arrangement becomes apparent. Essentially, the electrical control signals are applied at the terminals 52 and 54 to create a magnetic field at 59 through which field a ferromagnetic or other magnetic responsive fluid is pumped to form the flow $Q_{C1}$. The flow $Q_{C1}$ then modulates a reference flow $Q_{C2}$ of a standard fluidic material or of the same ferromagnetic material to create an output flow at the orifice 50 which has been varied by the input electrical signals 52–54. In the operation of the device, chambers 16 and 18 are fully filled with fluid to a certain pressure and variations in the pressure at 18 vary the output flow at 50 and thus the input flow to the fluidic utilization circuitry at 70.

The impact modulator type of active device shown in FIGURE 1 has the property of being capable of very high pressure gain and high input impedance. The pressure amplification can be as high as 200 times for each stage and the devices are such that they can be cascaded to provide overall gains by a factor of as much as 8,000. This device is therefore particularly useful where high pressure gain is desired and where flow gain is of secondary importance. This distinction is analogous to that between a voltage amplifier and a current amplifier in electronic circuitry. That is to say, the direct impact modulator is analogous to a voltage amplifier, whereas the vortex amplifier type of active fluidic device shown in FIGURES 2 and 3 is more nearly analogous to a current amplifier inasmuch as it affords a very high fluid flow gain.

Figure 2:
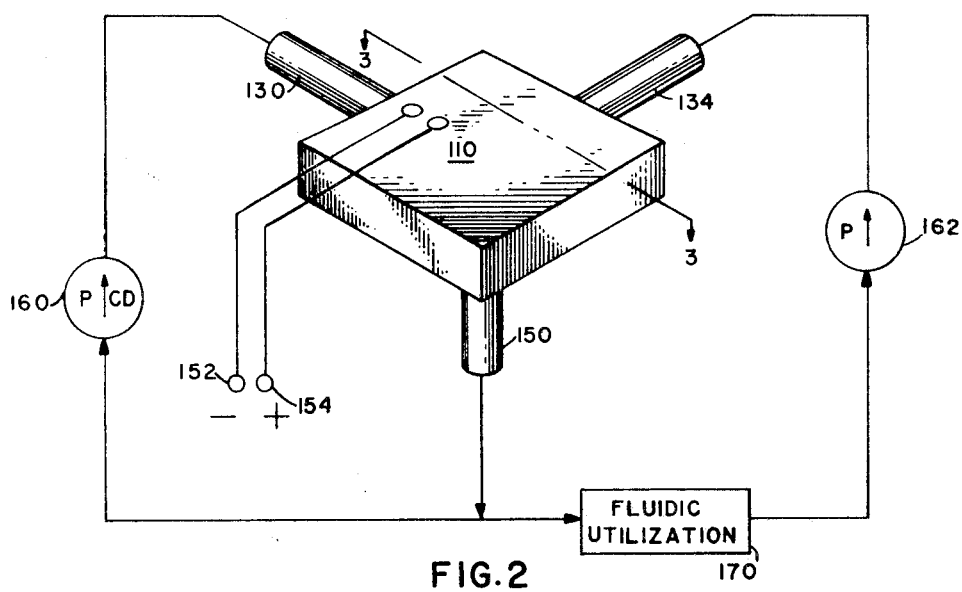
FIGURE 2 is an isomeric and partially schematic view of the present invention.
Figure 3:
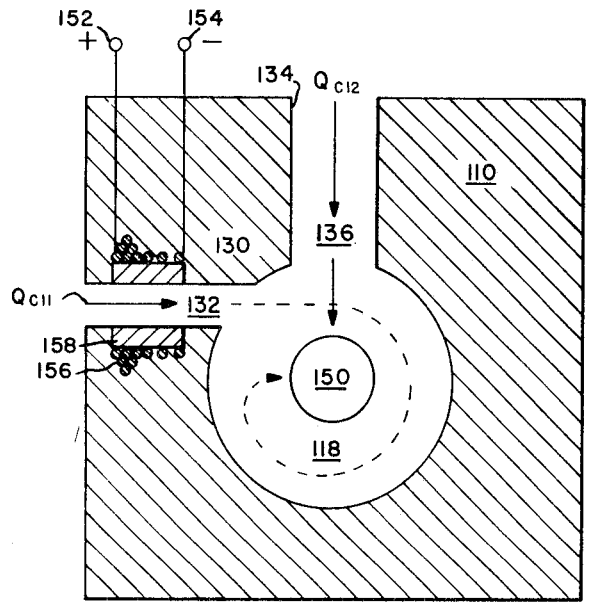
FIGURE 3 is a sectional view of the vortex amplifier itself, shown in FIGURE 2 and is taken on the line 3—3 in FIGURE 2.

In FIGURES 2 and 3, there is shown a detailed structural embodiment of the manner in which the electronic-to-fluidic direct interface is incorporated in a typical vortex amplifier. In FIGURES 2 and 3, parts analogous to or corresponding to parts already discussed in connection with FIGURE 1 are indicated by the same reference character increased by 100. That is to say, the body within which the plenum or working chamber is formed is identified in FIGURES 2 and 3 as 110, and the working chamber as 118. An inlet conduit 130 for control fluid has an orifice 132 opening into plenum 118. A power flow or working fluid conduit 134 has an orifice 136 opening into plenum 118. An outlet conduit 150 is positioned to receive the flow of power fluid.

In the absence of any flow of control fluid, the power flow is directed along vector $Q_{C12}$ and follows a radial path along the solid line arrow to flow directly out of outlet 150 in the center of the circular cylindrical chamber 118.

When a ferro-hydrodynamic control fluid is supplied to control conduit 130 so as to emerge at orifice 132, its flow will be along the vector $Q_{C11}$ and thence into the chamber 118 where it interacts with the flow $Q_{C12}$ of power fluid. This results in an interchange of momenta between the two jets; and the direction of flow of the power fluid is thereby changed so as to follow the dashed line path in a vortex within the chamber before reaching the exit port 150.

As may be seen more particularly from FIGURE 2, a constant delivery pump 160 supplies the ferro-hydrodynamic fluid to conduit 130. The working or power circuit of the device includes a fluidic utilization element 170 which is supplied with fluid from outlet 150 of the vortex amplifier. After utilization, the fluid is returned by a pump 162 to the power input conduit 134 of the vortex amplifier.

In order to achieve a modulation responsive to an electronic signal, there is positioned in surrounding and operative relationship with the inlet conduit 130 a winding 156 surrounding a magnetic core 158. An electronic signal is applied between terminals 152 and 154 in order that the coil 156 may generate a magnetic field axially along the supply conduit 130, so that the velocity and hence the momentum of the ferro-hydrodynamic control fluid is modulated responsively to the signal. Modulation of the control signal flow in turn modulates the extent of deflection of the power fluid emerging from orifice 136 into the working chamber 118 and hence achieve a modulation of the output flow to the load or fluidic utilization device 170.

Figure 5:
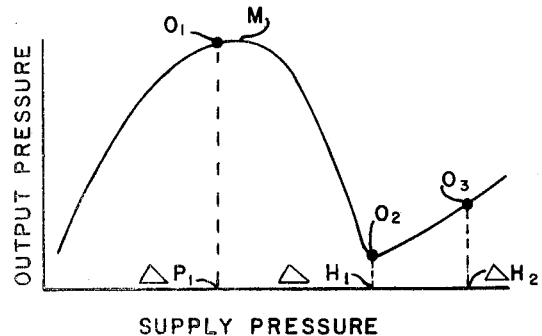
FIGURE 5 is a graph showing the output pressure of the device of FIGURE 4 plotted as a function of the supply pressure and indicating various characteristic operating points along the curve of the operating characteristics.
Figure 4:
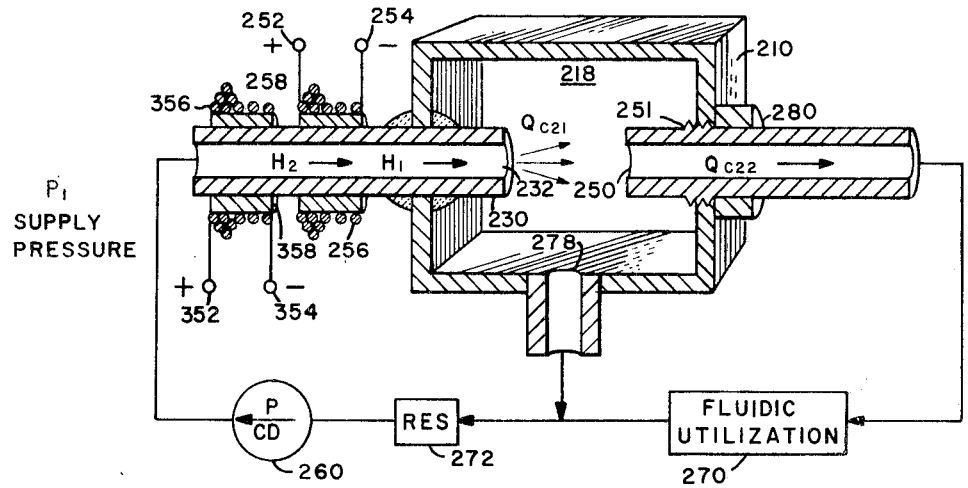
FIGURE 4 is a schematic side elevation in cutaway of an electronic-to-fluidic interface system incorporated in a turbulence amplifier to afford a device capable of electro-fluidic bistable operation.

Turning now to FIGURES 4 and 5, there is shown a fluidic turbulence amplifier which has been provided with the direct electronic-to-fluidic interface in order to provide an electro-fluidic bistable device. Again, reference characters corresponding to those used in earlier species have been repeated in FIGURE 4 for analogous or corresponding parts, but in this instance they are designated in the 200 series. Thus, the housing 210 contains a plenum or working chamber 218 into which ferro-hydrodynamic fluid is discharged through a supply conduit 230 having an orifice 232. An output conduit 251 is positioned to receive the fluid. A drain 278 for excess or unused fluid is provided at the bottom of chamber 210 and recirculates the fluid back through reservoir 272 and into constant delivery pump 260, which delivers the ferro-hydrodynamic fluid to the supply conduit 230 under a constant supply pressure $P_1$.

There is also provided on supply conduit 230 a first coil 256 nonlinearly wound on magnetic core 258, which surrounds the supply conduit 230 to produce an increasing magnetic field in conduit 230. Terminals 252 and 254 are connected to permit an electronic signal to be applied to the winding to generate a component of magnetic field $H_1$ in the supply conduit when a signal is applied. A second coil 356 is similarly wound on a similar core 358, axially displaced from the first core and winding along the supply conduit 230. The second coil is terminated in terminals 352 and 354, which are adapted to receive an electronic signal which in turn will generate a component $H_2$ of magnetic field in the supply conduit for a purpose which will be discussed later.

Coaxially positioned with respect to supply conduit 230 and penetrating the opposite wall of housing 210 is the outlet conduit 251, which receives at orifice 250 a portion of the fluid discharged from supply conduit 230. This portion is conducted through fluidic utilization device 270 and back to reservoir 272 to merge with that portion of the fluid which is drained from housing 218 through outlet 278. It will be noted that the outlet tube 251 is preferably threaded externally and seats in a threaded opening in the housing 210. It is held in position by a lock nut and seal arrangement 280. This arrangement may be provided if it is desired to adjust the positioning of the tube so as to control the distance horizontally between the orifice of the supply tube and the inlet orifice of the output tube 251.

Alternatively, if desired, the more conventional control jets could also be used in addition to the supply and discharge conduits in a turbulence amplifier. If this is done, of course, the electromagnetic central coils would be placed on the control jet conduit rather than on the supply conduit.

There is shown in FIGURE 5 a typical plot of the operating characteristics of a turbulence amplifier for one predetermined distance or spacing between the tubes. The abscissa in FIGURE 5 affords a measurement of the supply pressure in the supply tube 230 and the ordinate affords a measure of the resulting output pressure in the output tube 251. It will be noted that the output pressure first increases as a function of supply pressure until it reaches a point of maximum pressure, M, and then decreases rapidly before again beginning to increase. The decreasing portion of the curve is due to the onset of turbulence in the initially laminar flow of the jet leaving orifice 232.

When a laminar flow leaves a tube in the form of a jet, the flow remains laminar. In fact, the jet can be projected a distance up to 100 times the diameter of the tube and still remain in the laminar state. The distance from the tube at which the jet becomes turbulent depends on the velocity of the fluid stream and decreases as stream velocity is increased Now, consider the supply tube and the outlet tube placed a fixed distance apart. At very low velocities, the emerging jet is laminar. As the velocity of the laminar jet is increased, pressure in the output tube increases. Then, as the velocity is further increased, turbulence occurs between the supply tube and the output orifice. Pressure at the orifice then decreases rapidly with even a relatively small further increase of supply stream velocity. After total turbulence is obtained, a further increase in supply pressure again causes a gradual increase in output pressure.

In operation, the supply pressure $P_1$ from the constant delivery pump 260 is adjusted to the value $\Delta P_1$ shown in FIGURE 5. This fixed bias pressure establishes an operating point $O_1$ on the characteristic curve of FIGURE 5, which is in the high pressure region just to the left of maximum pressure M. When a signal is applied between terminals 252 and 254, the magnetic field $H_1$ thus generated causes an increase in pressure indicated by the range $\Delta H_1$ in FIGURE 5. This pressure increase is sufficient to transfer the device into the turbulence state and to move the operating point to the point $O_2$ in the low pressure region. The windings 258 and 358 are preferably made identical so that either or both of these windings will generate a magnetic field sufficient to move the operating point from $O_1$ to $O_2$. Of course, if both windings are simultaneously energized, the operating point is moved by an amount $\Delta H_1 + \Delta H_2$ on the abscissa, which corresponds to $O_3$ on the characteristic curve. This also is a point in the low pressure region. The device thus functions as a NOR logic element. In the absence of a signal applied to either coil, the device has an output pressure in the high range indicated by $O_1$. If an electric signal is applied to either or both of the coils on the supply tube, the output pressure drops to the low pressure values indicated by point $O_2$ or point $O_3$. The turbulence amplifier thus performs a logical NOR function. A NOR function can be used, as is well known, as the basis for circuitry implementing all other logic functions. The device shown in FIGURE 4 thus permits a direct translation of information from electronic to fluidic digital control or computation circuits.

While specific preferred embodiments of the invention have been described by way of illustration only, it will be understood that the invention is capable of many other specific embodiments and modifications and is defined only by the following claims.

What is claimed is:
1. An electro-fluidic active device comprising:
   a plenum;
   a first conduit discharging into said plenum;
   means to supply a ferro-hydrodynamic fluid to said first conduit, said fluid comprising a colloidal suspension of ferrous particles;
   a discharge conduit discharging from said plenum and positioned to receive fluid supplied to said plenum;
   electromagnetic means positioned in operative relationship with said first conduit for generating a magnetic field to alter the velocity and momentum of fluid flow in said conduit;
   means to apply an electrical input signal to said electromagnetic means to produce a fluidic output signal in said discharge conduit;
   said plenum is the working chamber of a fluidic turbulence amplifier;
   wherein said first conduit supplies said ferro-hydrodynamic fluid under a fixed bias pressure to said working chamber, said discharge conduit being positioned coaxially with said supply conduit to receive a portion of said fluid depending upon the distance between said supply and discharge conduits and upon the velocity of said fluid flow;
   wherein said electrical input signal to said electromagnetic means is effective to vary said velocity and momentum of fluid flow so as to produce a fluidic output pressure signal in said discharge conduit;
   the spacing of said supply conduit and said discharge conduit and the magnitude of said fixed bias pressure are such when acting alone as to produce laminar flow resulting in a first high pressure output in said discharge conduit; and
   wherein said electromagnetic means comprises first and second coils surrounding said first conduit to receive first and second electronic signals either of which will change the velocity of flow of said hydrodynamic fluid to produce turbulence in said working chamber and hence a low pressure turbulent flow in said discharge conduit.

References Cited

UNITED STATES PATENTS

| | | | |
|---|---|---|---|
| 2,661,596 | 12/1953 | Winslow | 103—43 XR |
| 3,416,549 | 12/1968 | Chaney et al. | 137—81.5 |
| 3,258,685 | 6/1966 | Horton | 137—81.5 XR |
| 3,266,514 | 8/1966 | Brooks | 137—81.5 |
| 3,272,215 | 9/1966 | Bjornsen et al. | 137—81.5 |
| 3,324,891 | 6/1967 | Rhoades | 137—81.5 XR |
| 3,388,713 | 6/1968 | Bjornsen | 137—81.5 |
| 3,390,693 | 7/1968 | Zlemmer et al. | 137—81.5 |

FOREIGN PATENTS

| | | |
|---|---|---|
| 1,303,872 | 8/1962 | France. |

SAMUEL SCOTT, Primary Examiner